Patented Oct. 27, 1936

2,058,771

UNITED STATES PATENT OFFICE 2,058,771

ACCELERATORS

Albert M. Clifford, Akron, Ohio, assignor to Wingfoot Corporation, Wilmington, Del., a corporation of Delaware No Drawing. Application September 28, 1934, Serial No. 745,947

16 Claims. (Cl. 18—53)

This invention relates to new aldehyde amine compounds. It includes the new compounds themselves, their use in rubber and rubber which has been vulcanized in their presence. More particularly the invention relates to condensation products of amines and furyl acrolein, which are accelerators of vulcanization of rubber. More particularly the invention relates to condensation products of this aldehyde with primary aliphatic amines.

Furyl acrolein may be obtained by the condensation of furfural with acetaldehyde in alkaline media at comparatively low temperatures. It has the formula—

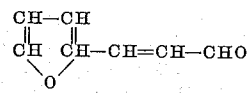

The amines which condense with this aldehyde to give accelerators include chain compounds such as methyl, ethyl, propyl, butyl, isobutyl, amyl, isoamyl, alkyl, etc. amines, ethylene diamine, diamino diethyl amine, triethylene tetramine and primary alicyclic amines such as cyclo hexyl amine, o- and p- methyl cyclo hexyl amines, 2-4 dimethyl cyclohexaylamine, hexahydro o- and p- phenetidines, hexahydro o- and p-anisidines, p-dimethyl amino cyclohexylamine, deca hydro naphthylamine, etc. Furfuryl amine and tetra hydro furfuryl amine likewise condense with furyl acrolein to give accelerators.

Aromatic primary amines also condense with furyl acrolein with elimination of water to give products which possess accelerator action. Although when used alone they do not have as marked an accelerating action as the condensation products prepared from the aliphatic amines, they may be used to advantage in admixture with other accelerators, such as dibenzo thiazyl disulfide, etc. As illustrative of the aromatic primary amines which may be condensed with furyl acrolein to give accelerators the following may be mentioned: aniline, the o-, m- and p- toluidines, cumidine, p-phenylene diamine, m-toluylene diamine, 2-4 diamino diphenyl amine, p-amino dimethyl aniline, p p' diamino diphenyl methane, p-amino benzyl aniline, benzidine, benzyl amine, phenyl ethyl amine, and tolyl ethyl amine, p-amino phenol, o- and p-phenetidines, p-anisidine, p-amino diethyl aniline, etc.

The preparation of these amine condensation products may be carried out as follows:

Example 1

One molar quantity (122 parts) of furyl acrolein was treated slowly and with cooling, and under a reflux, with one mol. (73 parts) of n-butyl amine. The reaction mixture became warm and separation of water was apparent. Reaction was completed by gentle heating for one-half hour, after which the water and low boiling constituents were removed by distillation. The residual, dark-colored syrup was used directly as an accelerator.

Example 2

Twenty-four and four-tenths parts of furyl acrolein were dissolved in 50 parts of benzene and the solution treated under a reflux with 18 parts of cyclohexyl amine. The mixture was refluxed for a short time and then subjected to distillation so as to remove the solvent and the water formed. The residual, dark colored oil was used as an accelerator.

Example 3

Mono amyl amine and furyl acrolein were condensed in mol./mol. ratio by heating under a reflux condenser in a benzene solution. The dark colored oil from which solvent and water were removed was used as an accelerator.

Example 4

One mol. proportion each of ethylene diamine and furyl acrolein were condensed by heating under a reflux in a benzene solution. The amine was used in the form of a 60% aqueous solution. The product of condensation was a pale brown solid, M. P. 60–70 degrees C.

Example 5

A mixture of equimolar parts of aniline and furyl acrolein was heated under a reflux condenser. The addition of a trace of acetic acid catalyzed the reaction remarkably. Water separated and after heating the mass about ½ hour it was removed by distillation. The residual product served as an accelerator.

In reacting furyl acrolein with other aromatic amines, such as ortho-toluidine and beta naphthylamine the use of a catalyst such as a small amount of acetic acid was also found desirable.

Various of these condensation products were incorporated in rubber mixes according to the following formula:

| | Parts by weight |
|---|---|
| Extracted pale crepe | 100 |
| Zinc oxide | 5 |
| Sulfur | 3 |
| Stearic acid | 1.50 |
| Accelerator | 0.50 |

Then, on testing, the cured samples gave the following results: (The time of cure is expressed in minutes at the temperatures indicated; the ultimate tensile strength is expressed in kg/sq. cm.; the maximum elongation is expressed in per cent; and the modulus at 500% and 700% elongation is given in kg/sq. cm.)

Accelerator of Example 1

| Cure | Tensile | Elongation | 500% | 700% |
|---|---|---|---|---|
| 20/260° F. | 48 | 975 | 8 | 15 |
| 40 | 83 | 820 | 15 | 40 |
| 80 | 125 | 805 | 21 | 69 |
| 60/285° F. | 171 | 775 | 29 | 109 |

Accelerator of Example 2

| | | | | |
|---|---|---|---|---|
| 60/260° F. | 81 | 940 | 8 | 22 |
| 80 | 95 | 860 | 12 | 38 |

Accelerator of Example 3

| | | | | |
|---|---|---|---|---|
| 40/260° F. | 52 | 975 | 6 | 12 |
| 60 | 90 | 970 | 9 | 20 |
| 80 | 106 | 920 | 11 | 30 |

Accelerator of Example 4

| | | | | |
|---|---|---|---|---|
| 20/260° F. | 40 | 900 | 6 | 15 |
| 40 | 96 | 936 | 9 | 28 |
| 60 | 116 | 900 | 13 | 40 |
| 80 | 122 | 870 | 15 | 47 |

Accelerator of Example 5

| | | | | |
|---|---|---|---|---|
| 60/285° F. | 95 | 835 | 13 | 41 |

Accelerator from 1 mol. furyl acrolein and 1 mol. o-toluidine

| | | | | |
|---|---|---|---|---|
| 60/285° F. | 71 | 930 | 10 | 20 |

The condensation products of this invention find use in the activation of certain sulfur type accelerators such as dibenzo thiazyl disulfide and various other mercapto benzo thiazol derivatives.

I claim:

1. Condensation products of furyl acrolein and amines containing at least one NH2 group, said products being prepared by the condensation of furyl acrolein and an amine containing at least one NH2 group under conditions eliminating water.

2. Condensation products of furyl acrolein and primary aliphatic amines, said products being obtainable by the condensation of furyl acrolein with a primary aliphatic amine under conditions eliminating water.

3. Condensation products of furyl acrolein and primary aromatic amines, said products being obtainable by the condensation of furyl acrolein with a primary aromatic amine under conditions eliminating water.

4. Condensation products of furyl acrolein and primary alicyclic amines, said products being obtainable by the condensation of furyl acrolein with a primary alicyclic amine under conditions eliminating water.

5. The condensation product of furyl acrolein and ethylene diamine, said product being prepared by reacting furyl acrolein with ethylene diamine under conditions eliminating water.

6. The method of producing accelerators of vulcanization which comprises reacting furyl acrolein with a primary amine under conditions eliminating water.

7. The method of treating rubber which comprises incorporating in a rubber mix a condensation product of furyl acrolein and an amine containing at least one NH2 group, said product being prepared by splitting out the oxygen of the aldehyde radical of the acrolein and the hydrogen of at least one of the NH2 groups of the amine in the form of water, and then curing the mix.

8. The method of treating rubber which comprises incorporating in a rubber mix a condensation product of furyl acrolein and a primary aliphatic amine, said product being prepared by splitting out the oxygen of the aldehyde radical of the acrolein and the hydrogen atoms of a primary amino radical of the amine in the form of water, and then curing the mix.

9. The method of treating rubber which comprises incorporating in a rubber mix a condensation product of furyl acrolein and a primary aromatic amine, said product being prepared by splitting out the oxygen of the aldehyde radical of the acrolein and the hydrogen atoms of a primary amino radical of the amine in the form of water, and then curing the mix.

10. The method of treating rubber which comprises incorporating in a rubber mix a condensation product of furyl acrolein and a primary alicyclic amine, said product being prepared by splitting out the oxygen of the aldehyde radical of the acrolein and the hydrogen atoms of a primary amino radical of the amine in the form of water, and then curing the mix.

11. The method of treating rubber which comprises incorporating in a rubber mix the condensation product of furyl acrolein and ethylene diamine, said product being prepared by splitting out the oxygen of the aldehyde radical of the acrolein and the hydrogens of at least one of the amino radicals of the diamine in the form of water, and then curing the mix.

12. Rubber which has been cured in the presence of a condensation product of furyl acrolein and an amine containing at least one NH2 group, said product being prepared by splitting out the oxygen of the aldehyde radical of the acrolein and the hydrogen of at least one of the NH2 groups of the amine in the form of water.

13. Rubber which has been cured in the presence of a condensation product of furyl acrolein and a primary aliphatic amine, said product being prepared by splitting out the oxygen of the aldehyde radical of the acrolein and the hydrogen atoms of a primary amino radical of the amine in the form of water.

14. Rubber which has been cured in the presence of a condensation product of furyl acrolein and a primary aromatic amine, said product being prepared by splitting out the oxygen of the aldehyde radical of the acrolein and the hydrogen atoms of a primary amino radical of the amine in the form of water.

15. Rubber which has been cured in the presence of a condensation product of furyl acrolein and a primary alicyclic amine, said product being prepared by splitting out the oxygen of the aldehyde radical of the acrolein and the hydrogen atoms of a primary amino radical of the amine in the form of water.

16. Rubber which has been cured in the presence of the condensation product of furyl acrolein and ethylene diamine, said product being prepared by splitting out the oxygen of the aldehyde radical of the acrolein and the hydrogens of at least one of the amino radicals of the diamine in the form of water.

ALBERT M. CLIFFORD.